(12) United States Patent
Jacobson et al.

(10) Patent No.: US 6,446,787 B2
(45) Date of Patent: Sep. 10, 2002

(54) CONVEYOR FOR GARMENT HANGERS

(75) Inventors: Carl-Magnus Jacobson, Borås; Henrik Gregorsson, Fristad, both of (SE)

(73) Assignee: Jensen Sweden Aktiebolag, Boras (SE)

( * ) Notice: Subject to any disclaimer, the term of this patent is extended or adjusted under 35 U.S.C. 154(b) by 0 days.

(21) Appl. No.: 09/887,331

(22) Filed: Jun. 25, 2001

Related U.S. Application Data (63) Continuation-in-part of application No. PCT/SE99/02458, filed on Dec. 22, 1999.

(30) Foreign Application Priority Data

Dec. 23, 1998 (SE) .............................................. 9804532

(51) Int. Cl.$^7$ .............................................. B65G 43/08
(52) U.S. Cl. ................................... 198/465.4; 198/678.1
(58) Field of Search ........................... 198/678.1, 465.4, 198/723, 725, 728

(56) References Cited

U.S. PATENT DOCUMENTS

| | | | |
|---|---|---|---|
| 3,799,318 A | * | 3/1974 | DeKoeKKoeK ..... 198/465.4 X |
| 5,337,883 A | * | 8/1994 | Kurlmann ................. 198/465.4 |
| 5,441,158 A | * | 8/1995 | Skinner ............... 198/678.1 X |
| 5,480,020 A | | 1/1996 | Schneuing et al. ...... 198/465.4 |

FOREIGN PATENT DOCUMENTS

| | | |
|---|---|---|
| DE | 4431582 A1 | 3/1996 |
| DE | 19538985 A1 | 4/1997 |
| EP | 0551049 A1 | 7/1993 |

* cited by examiner

Primary Examiner—James R. Bidwell
(74) Attorney, Agent, or Firm—Birch, Stewart, Kolasch & Birch, LLP (57) ABSTRACT

The present invention relates to a conveyor for garment hangers, comprising an endless mechanism disposed inside sections with a longitudinal slot upwards, said mechanism having carriers, which project through said slot, and said sections having first sliding surfaces, which are arranged in such a way that a hanger is positioned essentially at right angles in relation to the direction of advance of the conveyor, wherein arranged between two sections is a part with a second sliding surface formed in such a way that the hanger can be turned into a position which is essentially parallel with regard to the direction of transportation.

20 Claims, 10 Drawing Sheets

CONVEYOR FOR GARMENT HANGERS

This application is a continuation-in-part of PCT international application No. PCT/SE99/02458 which has an international filing date of Dec. 22, 1999 which designated the United States, the entire contents of which are hereby incorporated by reference.

TECHNICAL FIELD

The present invention relates to a conveyor for garment hangers, comprising an endless mechanism disposed slidably inside sections with an upwardly open, longitudinal slot, said mechanism having carriers which project through said slot (6) to push a garment hanger along said conveyor.

PRIOR ART AND PROBLEMS

In connection with the industrial handling of clothes, for example washing, it is normal for these to be conveyed between certain stations by means of a conveyor. Usually a chain/link conveyor is used, which consists of an endless loop of chains or links and by means of which the garment hangers are moved along the conveyor. Often a conveyor of this kind is constructed by means of modules comprising sections, which are coupled together in the desired manner, each section consisting of a housing which is essentially U-shaped in cross-section with the opening upwards, through which a carrier projects, which is arranged on the loop, which is disposed slidably inside the connected sections. The outer contour of the U-shaped cross-section has a top side which is adapted to the curve of a garment hanger hook, so that the garment hanger can be moved securely, sliding along the conveyor without it swaying about its vertical axis, which could otherwise cause problems. In addition, special sliding elements are suitably disposed inside grooves in the sections, which serve as running surfaces but also have the purpose of reducing friction and preventing joints from occurring between sections.

This known form of conveyor has many advantages and is therefore used to a large extent. One of these advantages is that the garment hangers are positioned in a very secure manner at right angles to the direction of transportation, thanks to the shape, which thus interacts with the garment hanger in such a way that the hanger is not permitted to sway about the vertical axis of the hanger hook, but holds the hanger and thus the garment securely in a perpendicular position relative to the direction of transportation.

However, it has proved to be the case that certain operations cannot be executed without problems in connection with such positioning of the garment on the conveyor. For example, when scanning a bar code or a transponder, which may be present on the article of clothing, it can be difficult to perform this scanning reliably if the garment is positioned at right angles to the direction of advance. It is thus desirable in certain cases to have the garment hanger positioned essentially parallel to the direction of advance, so that a scanning unit situated parallel to the belt can perform scanning securely as the garment passes by.

It is previously known through EP-B-551049 to change the structure of the feed screw on worm conveyors so that the garment hanger is turned to become positioned parallel to the direction of advance in connection with passage past a scanning unit, so that reliable scanning can be carried out. However, it is not desirable in connection with chain/link conveyors to add a further feed device, in the form of a worm conveyor, to the conveyor already existing, as this causes practical complications and also results in a considerable additional cost.

SOLUTION AND ADVANTAGES

The object of the present invention is to eliminate or at least reduce the problems mentioned above by means of a conveyor for garment hangers comprising an endless mechanism disposed inside sections with a longitudinal slot, said mechanism having carriers which project through said slot and said sections having first sliding surfaces, which are arranged in such a way that a garment hanger is positioned essentially at right angles to the direction of advance of the conveyor, characterized in that disposed between two sections is a part with a second sliding surface formed in such a way that the hanger can be turned to a position which is essentially parallel with regard to the direction of transportation.

This solution has many advantages. Above all, it means that the same endless loop can be used both to obtain secure positioning of the garment hanger in a perpendicular position in relation to the direction of transportation along the sections where this positioning is advantageous, and also to obtain positioning of the hanger in a position which is parallel to the direction of transportation along parts of the conveyor where this is desirable, for example with a view to being able to facilitate reliable scanning of markings on the garment on the hanger. Above all, the need to install further conveyors is eliminated by these means, reducing the cost considerably.

According to further aspects according to the invention, it holds good that:

- said second sliding surface (14) is disposed on a bar (16) with a shaping which permits the hanger (7) to be turned about the vertical axis of the hanger hook,
- said bar (16) has a maximum thickness in its horizontal cross-direction of less than 20 mm, preferably a maximum thickness of between 3 and 12 mm, and more preferably between 6 and 10 mm,
- said bar (16) has a circular cross-section,
- said bar is placed by the mechanism (2) so that it follows the extension of this and at a distance in relation to this which is less than the length of said carrier (8),
- said part (30) comprises a sharp bend (18), preferably approx. 90°,
- an operating unit (22), preferably with scanning organs, most preferably a so-called aerial screen, is positioned adjacent to said bend (18),
- said operating unit (22) comprises a level wall (24), which is disposed in a plane which is essentially parallel to the direction of advance of the conveyor (2) following the bend (18),
- said second sliding surface (14) at each end of said part (30) is disposed at essentially the same height and in essentially the same vertical plane as the first sliding surface (12) in each adjoining section (4A, 4B),
- the bar (16) has a first part (16A) which is disposed directed obliquely upwards in relation to the direction in which the sliding surface (12) extends at the end of said adjoining section (4A) and a second part (16B) extends essentially horizontally and connects to said bend (18),
- the bar comprises a third part (16C) which extends essentially horizontally on the other side of said bend (18) and a fourth part (16D) disposed directed obliquely downwards in relation to the longitudinal direction in which said adjoining section (4B) extends,
- each section (4) has longitudinal recesses (26), which have an essentially circular cross-section and arranged inside which are said sliding surfaces (10, 12), the bar (16) inserting into one of said recesses (26) at the end of each adjoining section (4A, 4B), preferably in contact with a sliding element (12), so that the occurrence of joints is eliminated or reduced, a second bar (28), is disposed extending in parallel with said first and second part of the bar (16A, 16B), a stop device (32) is disposed along the third part (16C) of the bar at a limited height above this, with the aim of preventing the hangers from being pushed off as a consequence of the movement of the carrier (8), said slot (6) is open upwardly and is disposed between two sliding elements which form said first sliding surfaces (10, 12), and said mechanism (2) is formed by a chain/link mechanism, which is disposed slidably inside said sections (4).

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF DRAWINGS

The invention will be described below in greater detail in connection with the enclosed drawings, which are given by way of illustration only, and thus are not limitative of the present invention, and in which.

DETAILED DESCRIPTION

Figure 1:
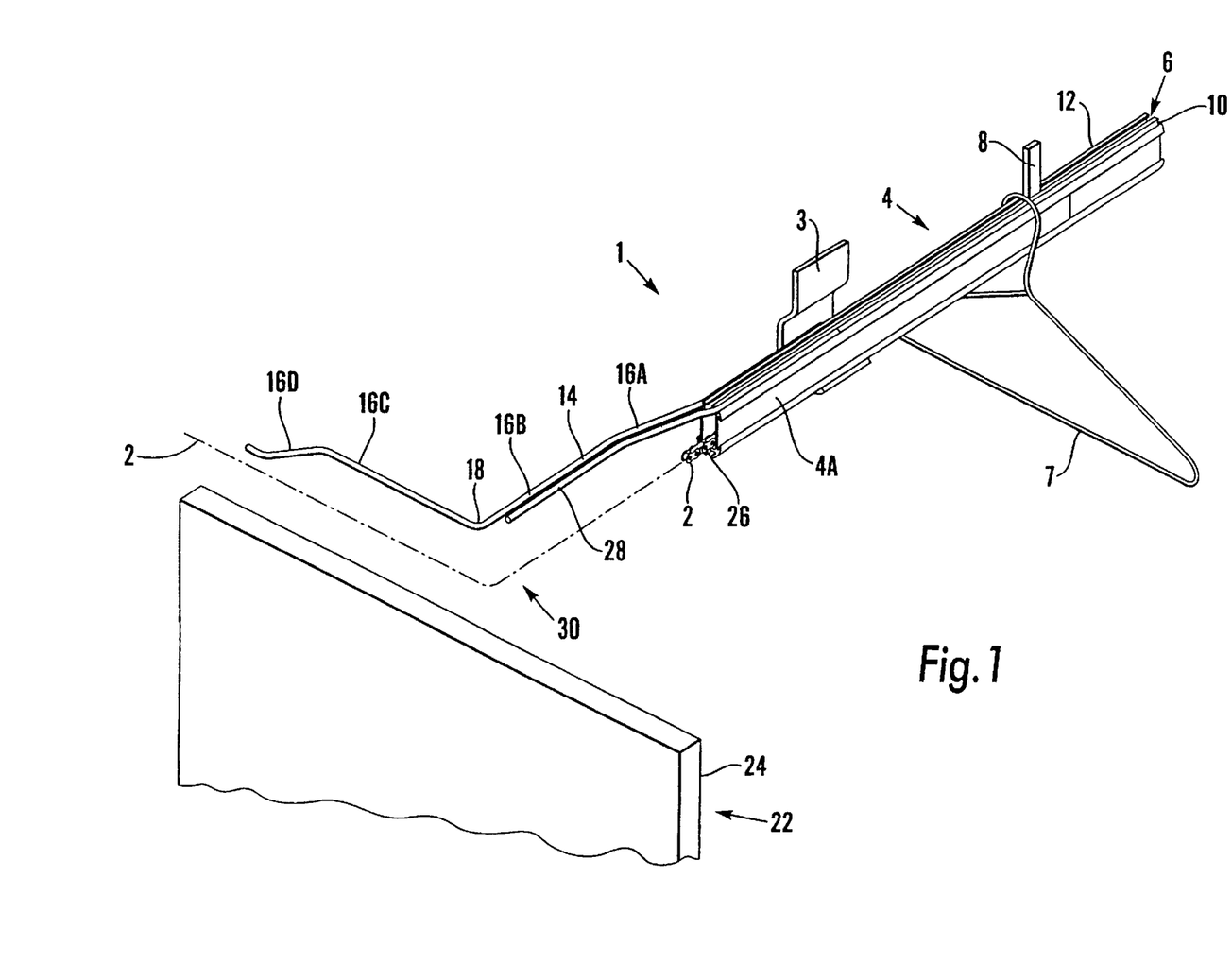
FIG. 1 shows a view in perspective of a part of a conveyor according to the invention.

FIG. 1 shows the fundamental principles of a conveyor 1 according to the invention. The conveyor 1 is intended to move garment hangers 7. The hangers 7 are designed in a known manner with an open hook, a so-called hanger hook, which hangs on top of a continuous rail 4 which consists of a number of assembled sections 4, which all have a similar U-shaped cross-section with the opening, in the form of a slot 6, directed upwards. Located inside the cavity of the sections is a chain/link conveyor 2, which is endless. Disposed at set intervals on the endless chain/link mechanism 2 are carriers 8, which project a considerable distance through the slot 6. The rail 4 is arranged on a wall or the like by means of bracket element 3, which is designed in such a way that the garment hanger 7 can slide past this unhindered. In order to provide a good sliding surface and also act as a wearing/replacement part, sliding elements 10, 12 are disposed on the sections on each side of the slot 6. These sliding elements are best formed of some polymer material. In the preferred execution, these are arranged inside the casings 26 which are disposed parallel to the slot in each section 4. The sliding elements are best formed from long units, which are threaded into and through a number of sections 4 so that a continuous sliding surface 10, 12 is formed without joints. These sliding surfaces 10, 12 are arranged at such a distance in relation to the slot 6 that a garment hanger 7 is positioned essentially at right angles in relation to the direction of advance of the conveyor 1. This form of conveyor is known from earlier.

Figure 2:
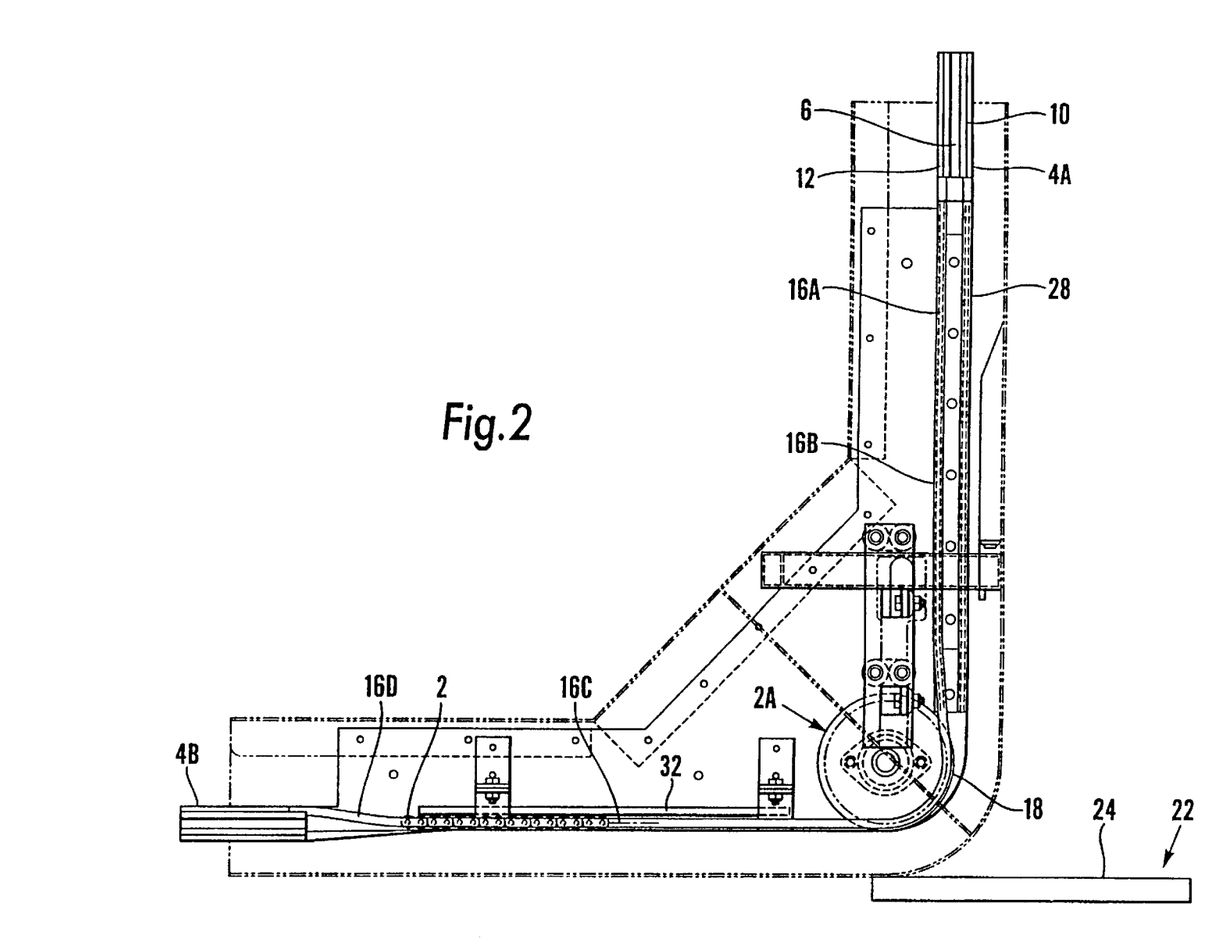
FIG. 2 shows a view from above of an essential part of a conveyor according to the invention.

In a view from above, FIG. 2 shows a part 30 of the conveyor 1 which has the object of being able to reposition the articles of clothing hanging on the garment hangers 7 from moving at right angles in relation to the direction of advance and instead being able to move parallel to the direction of advance between two adjacent sections 4A, 4B. The part 30 comprises a bar 16 with an upper sliding surface 14, which connects to one sliding surface 12 of each adjoining section 4A, 4B, preferably in such a way that no joint is formed. Extending in parallel with said bar 16 is a second bar 28, which is arranged in connection with a second sliding surface 10 of one adjoining section 4A, preferably also in such a way that joints are avoided. The bar 16 is best formed of round bar with a diameter which is adapted to the housing 26 for the sliding elements 10, 12, so that it can be inserted into this housing 26 until it lies close to the end of the respective sliding element 10, 12.

Figure 3:
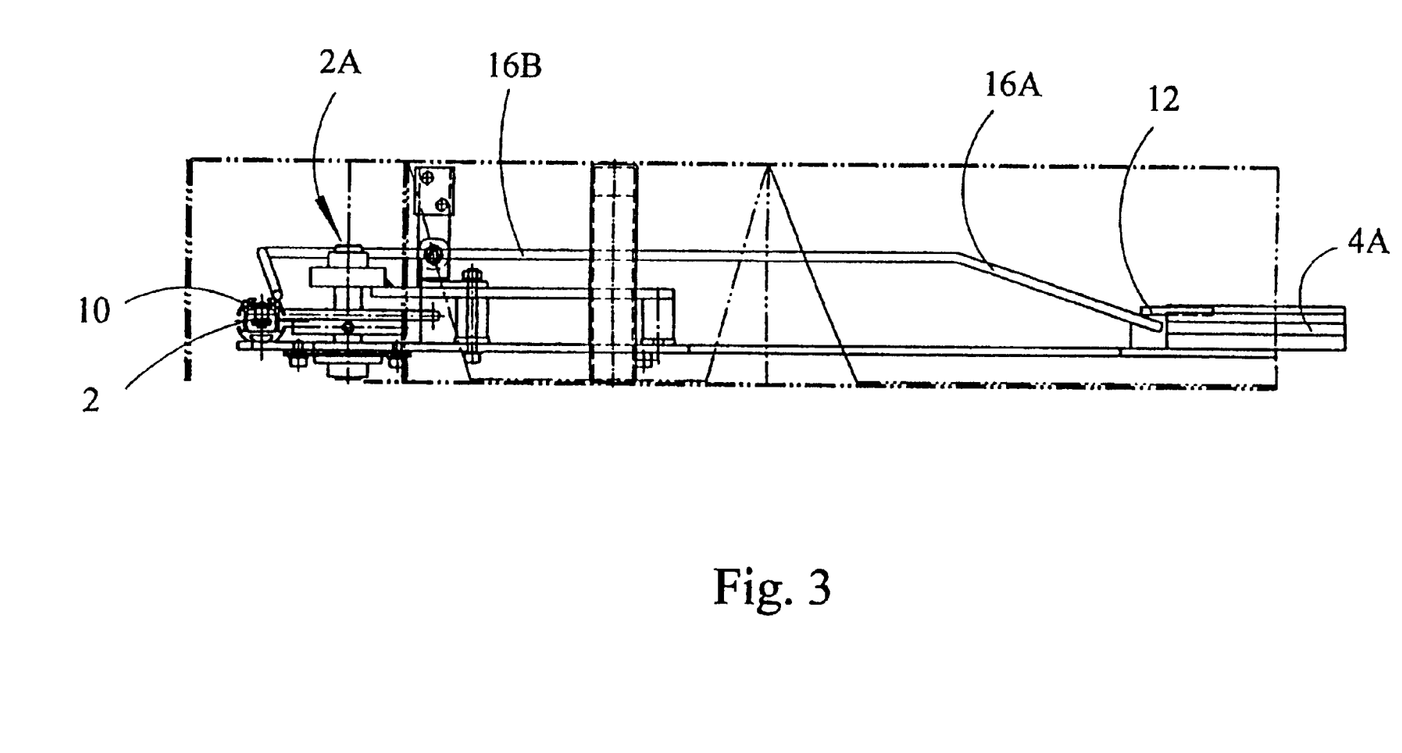
FIG. 3 shows a first side view of the part shown in FIG. 2.

FIG. 3 shows that the bar 16 along a first part 16A extends obliquely upwards in relation to the plane 2A on which the chain conveyor 2 rests. Along a second part 16B it extends essentially in parallel with the plane on which the chain conveyor rests, at a distance from this so that the carrier 8 continues to project above the upper surface of the bar, due to which it is ensured that the carrier 8 is always in contact with the hanger which is on the bar 16. Beside the first bar 16, a second bar 28 extends along a first part 30A, which second bar is disposed essentially in parallel with the first bar 16 and at a distance which corresponds to the distance for the sliding element 10, 12, so that the hanger is positioned along this first part 30A essentially at right angles in relation to the direction of advance. Between the second part 16B of the bar 16 and a third part 16C there is a bend 18 (see FIG. 2), which is approx. 90°, so that the third part of the bar 16C extends essentially at right angles in the horizontal plane in relation to the direction of the bar along the second part 16B. A fourth part 16D of the bar (see FIGS. 2 and 4) is angled downwards to join the end of the bar to an adjoining section 4B of the conveyor 1.

Figure 4:
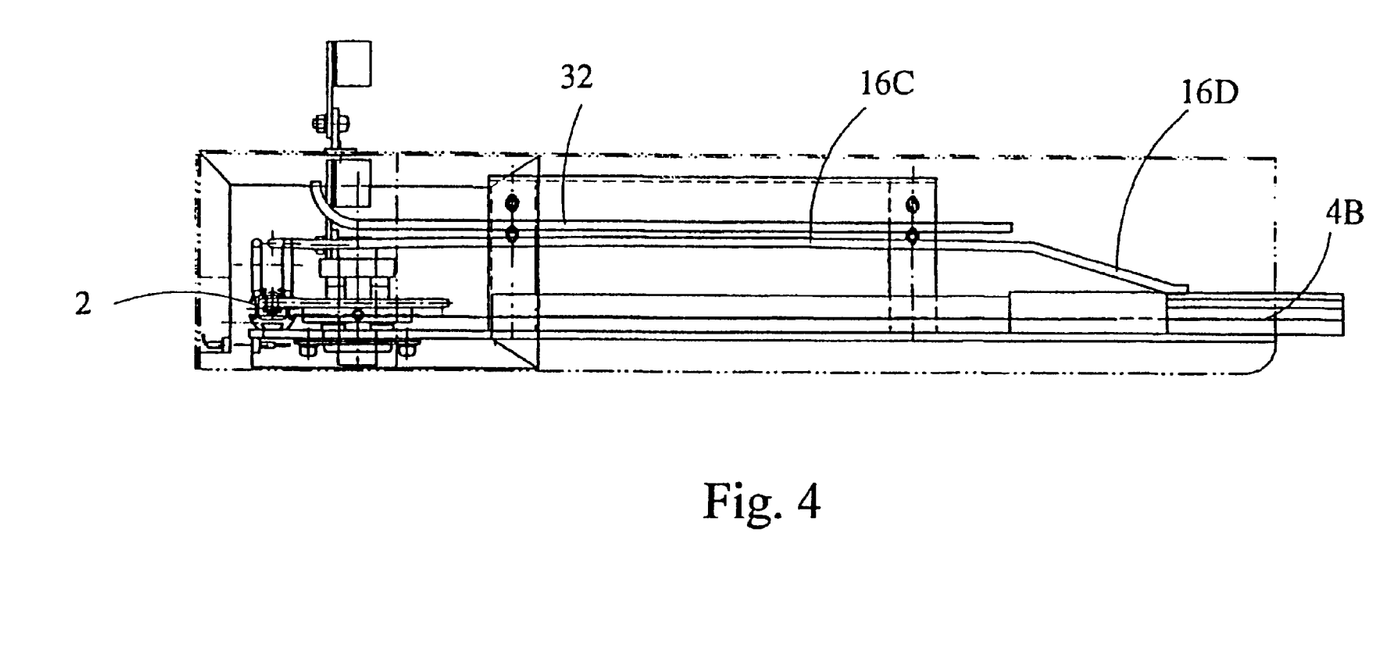
FIG. 4 shows a second side view of the part shown in FIG. 2.

FIG. 4 shows that after the bend 18 there is a third part 16C of the bar 16 which extends essentially at right angles in the horizontal plane in relation to the direction of the bar along the second part 16B. A fourth part 16D of the bar is angled downwards to join the end of the bar to an adjoining section 4B of the conveyor 1. Furthermore, it is shown that arranged above the bar 16 along its third part 16C is a stop device 32, the purpose of which is to prevent garment hangers from falling off the bar 16 when these are advanced forward by means of the carrier 8.

FIG. 2 shows also that arranged in parallel with the extension in a vertical plane along the second part 16C of the bar is a so-called aerial screen 22, for scanning markings disposed on the garment. Apart from the required electronics (not shown), the aerial screen 22 consists of a level wall (24), which is arranged in a plane which is essentially in parallel with the conveyor's (2) direction of advance following the bend (18).

The object of the invention is to achieve secure positioning of an article disposed on a garment hanger 7 in relation to a scanning unit 22, so that reliable scanning can be effected when this article passes by.

The conveyor functions as follows. A garment hanger 7 with an item of clothing equipped with marking is conveyed by means of the chain conveyor 2 and its carrier 8 along the rail 4 by sliding on top of this. The garment hanger here is situated essentially at right angles to the rail 4, thanks to the fact that the two sliding elements 10, 12 are placed at a sufficiently great distance from one another to counteract the hanger turning about the vertical axis of the hanger hook. The hanger is carried further on towards a last normal section 4A and then up onto the two bars 16, 28, where they are raised upwards along a first part 16A thanks to the angle of the bars. A second part then follows, still consisting of two bars 16, 28 arranged in parallel, the garment hangers retaining their essentially perpendicular position in relation to the direction of advance. Immediately before the bend 18, the second bar 28 ends, so that the hanger then hangs only around one bar 16. Owing to the fact that the bar 16 is of a relatively small diameter, normally approx. 8–10 mm, the hanger can turn moderately unobstructedly in the vertical plane. Owing to this, the hanger 7 can continue to be positioned following the 90° bend 18 with the same extension as when it was transported along the second part 16B of the bar 16, thanks to the fact that its garment comes into contact with the flat surface 24 of the aerial screen 22. The conveyor 2, which thus extends essentially directly below the bar 16, thus continues to push the hanger with its carrier 8 along the bar 16 also along its third part 16C. The hanger is thereby moved in parallel with the aerial screen 24, so that the marking on the article of clothing can be scanned securely and simply, for example either by means of some form of bar code scanner or transponder technology. It is then moved along the fourth part 16D, which is angled downwards and the end of which is essentially joined to the sliding surface 12 in a starting section 4B of a second rail 4, on which the hanger 7 is conveyed further.

Figure 5A:
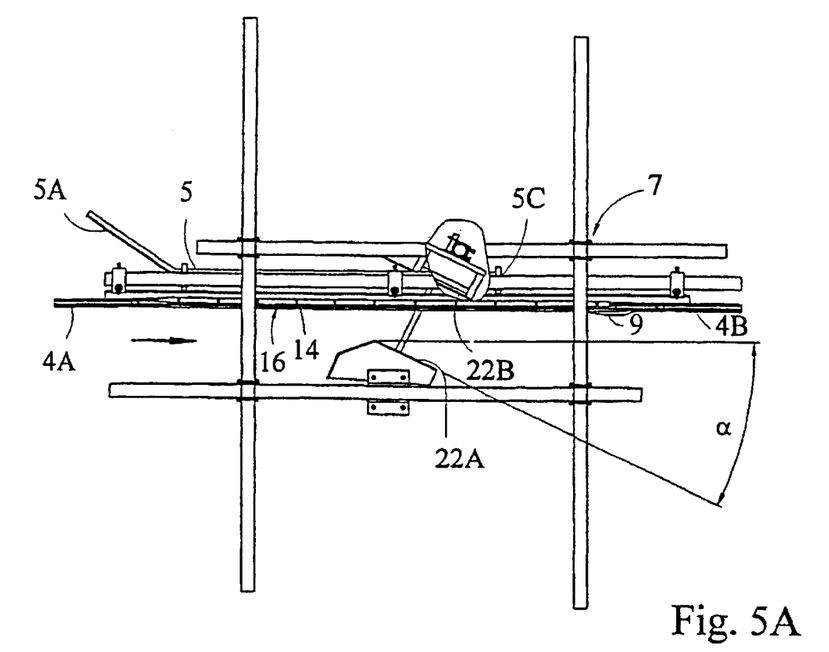
FIGS. 5A, B show an alternative execution of an arrangement according to the invention.
Figure 5B:
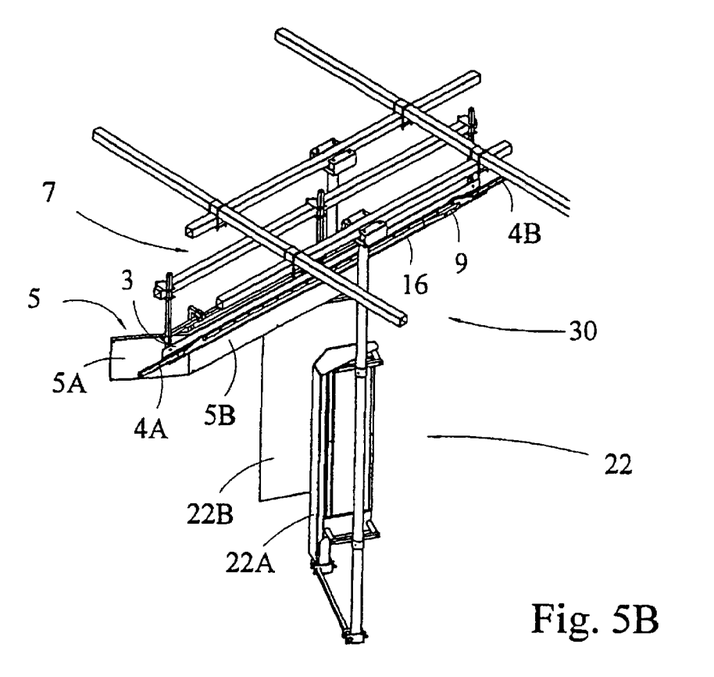

FIGS. 5A and B show an alternative execution of an arrangement according to the invention. FIG. 5A shows the device from above and FIG. 5B shows it in perspective. The principles on the whole are the same as described above, but no bend is used in order to achieve positioning of the articles of clothing for scanning; rather this is effected along a "straight section" using other facilities in accordance with what will be described in greater detail below. A part 30 is shown with a bar 16 which extends between two "ordinary" sliding sections 4A, 4B. The bar 16 is mounted by means of bracket-like elements 3 on a frame structure 7, which also supports an operating unit 22. The operating unit 22 is formed by a scanner arrangement consisting of two wall-like opposing elements 22A, 22B disposed at a distance from one another. The bar 16 is arranged above the space which is formed between the two opposing elements 22A, 22B. The normal to the main part of the surfaces of said opposing elements 22A, 22B forms the angle in relation to the direction of transportation (which coincides with the longitudinal extension of the bar 16) which is approx. 60°, whereby the surfaces of said operating units 22A, 22B extend essentially in parallel, at an angle α which is approx. 30° with regard to the direction of transportation. (By essentially in parallel it shall be understood that the angle between the two directions which are being compared is less than 45°, preferably around or less than 30°). A control device 5 comprising two sections 5A, 5B is arranged adjacent to the inlet end and to one side of the bar 16.

Figure 6:
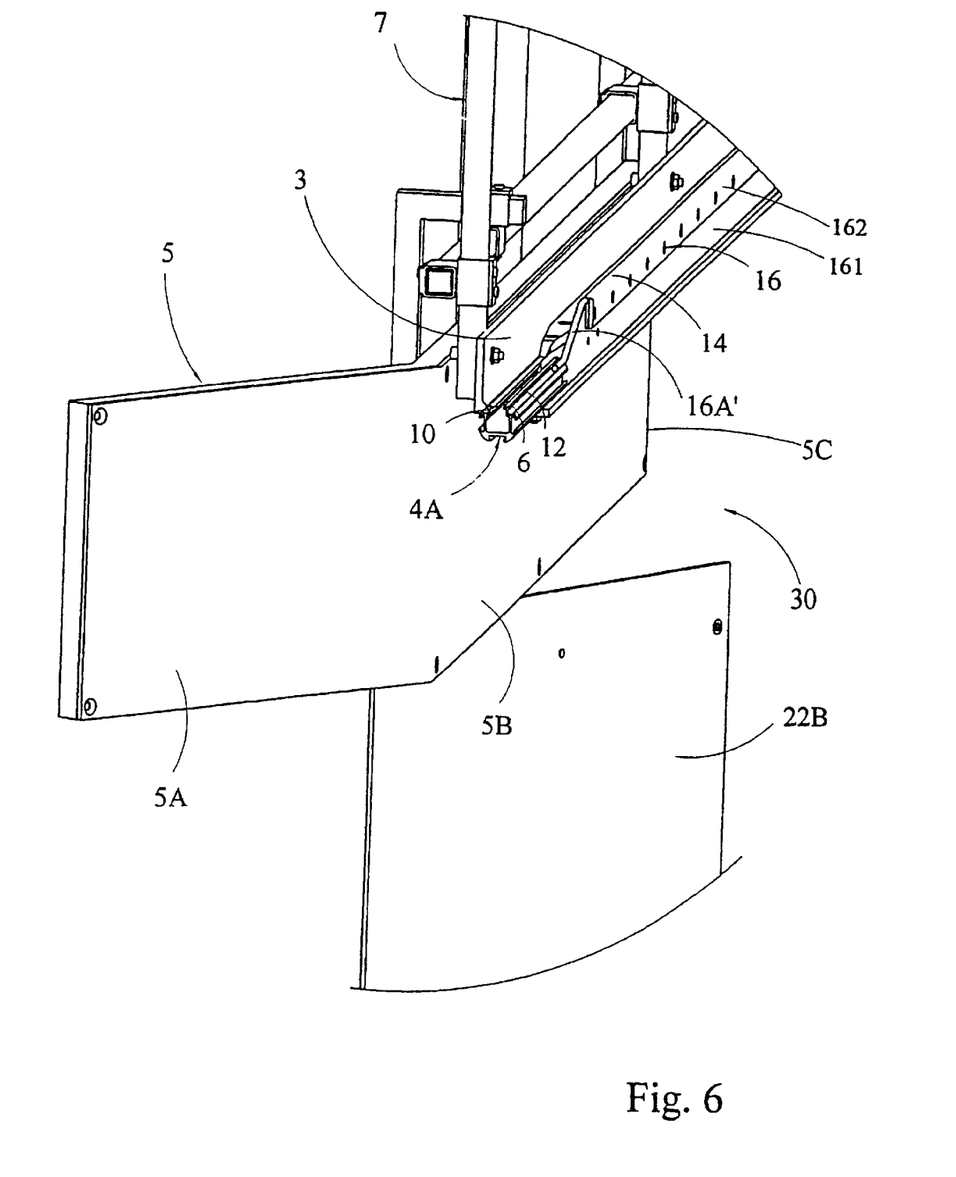
FIG. 6 shows the inlet end of an arrangement according to FIG. 5.

FIG. 6 shows the inlet end of a section 30 according to FIG. 5 in greater detail. It is evident that the section 30 is arranged by an adjoining section 4A, which is designed in a similar manner to that described above. The bar 16 consists in principle in this execution of a flat bar with a rectangular cross-section, the flat bar being fitted so that its shortest cross-sectional side is directed upwards and forms a sliding surface 14 for a garment hanger.

According to the preferred execution shown, the bar 16 consists of two assembled parts 161, 162, namely a plate 161 fixed on a bracket element 3 and a sliding part 162 screwed tightly onto this. The sliding part 162 is best executed in some easily worked material with low friction (for example polyamide) and at best L-shaped so that it can be arranged on the plate 161 so that a low friction system completely covers the upper edge of the plate 161, a low-friction surface thus forming the sliding surface 14. Located between the adjoining section 4A and the bar 14 and arranged at an obliquely upward angle is a transition part 16A', which is best formed from round bar which is bent to a suitable angle according to the same principle as described in connection with earlier figures and which rests on top of a bevel-cut edge of the plate 161. An essentially joint-free transition is hereby obtained between the inlet section 4A and the sliding surface 14 of the bar. It is perceived that, instead of a separate transition 16A' and an assembled bar 16, this part can be formed from a single piece by means of the fact that the plate 161 is of a thickness suited to be able to form the flat bar 16 and which is shaped at each end in a suitable manner to achieve the desired transition zones. Extending in parallel with the bar 16 is a control surface 5B turned inwards. This control surface 5B extends in a vertical plane which is positioned at a distance from the vertical plane in which the bar 16 extends. The distance between the two last-named planes is suitably between 50–200 mm, preferably between 80–160 mm. Said surface 5B extends for a limited distance in parallel, along the bar 16, so that its further end 5C (seen in the direction of transportation) ends before the further end of the bar 16E (also seen in the direction of transportation). Said control surface 5B forms a second control surface in a second section of the aforementioned control device 5, which also comprises a first control surface 5A, which extends in a first section at an acute angle in relation to the vertical plane for said second control surface 5B. This angle is suitably less than 45° and more preferably approx. 30°.

Figure 7:
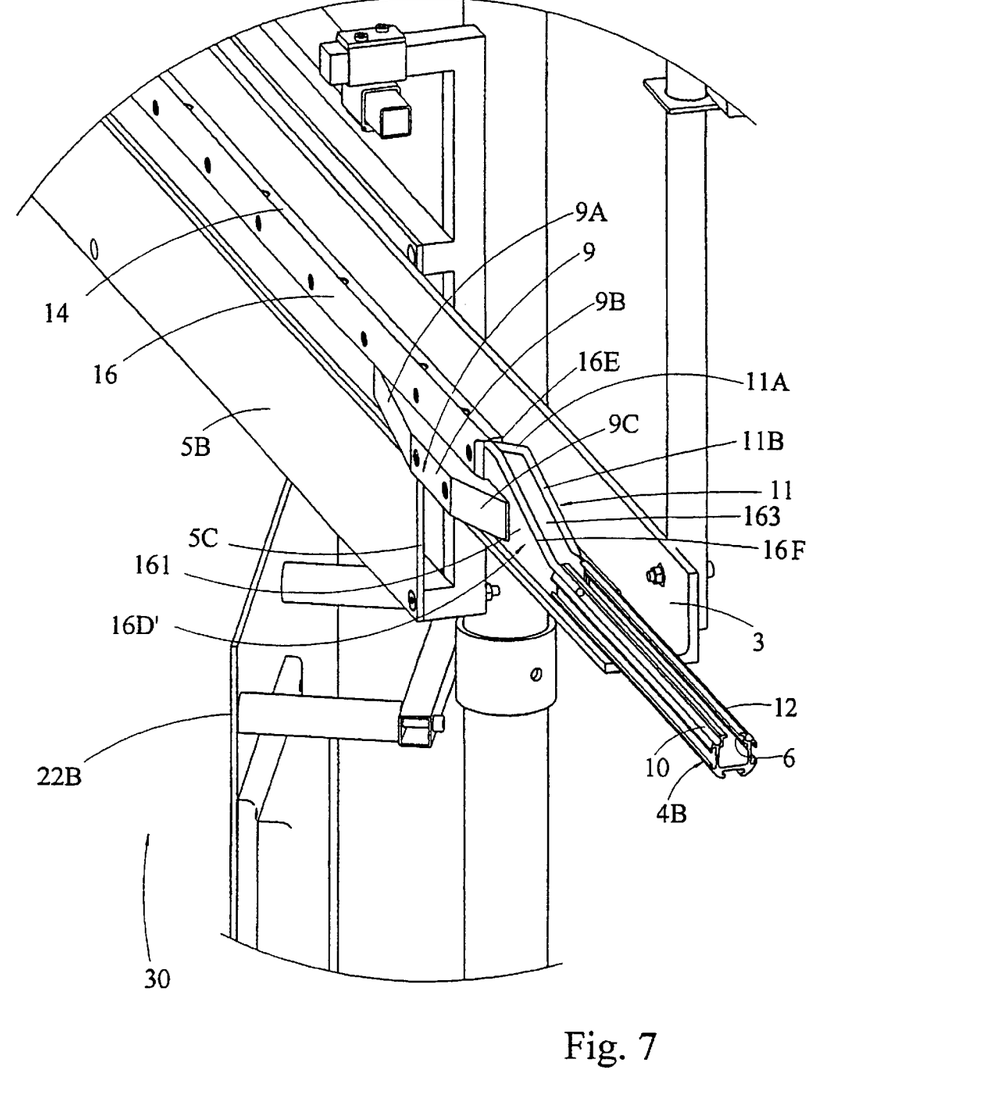
FIG. 7 shows the outlet end of an arrangement according to FIG. 5.

FIG. 7 shows the outlet end from said part 30 and its adjoining sliding section 4B. It is shown that the bar 16 with its sliding surface 14 has at its end 16E a transition arrangement 9, 16D'. The first of these transition arrangements 9 disposed in the direction of transportation is placed below the sliding surface 14 on the right side of the sliding surface seen in the direction of transportation. This part 9 has a first, bevelled surface 9A, which extends in a diverging manner in relation to the direction of transportation, in order to pass over into a level surface 9B which extends in parallel with the direction of transportation, which in turn passes into a second bevelled surface 9C which extends in a converging manner in relation to the direction of transportation. The transition zone 16D' between the upper sliding surface 14 and adjoining sliding section 4B consists on the one hand of said plate structure 161, arranged on top of which is a bent wire 16F, which connects essentially without joints between the sliding surface 14 for the bar 16 and the one sliding surface 10 for the adjoining section 4B. (The bar 16 thus extends basically in the same vertical plane as the first sliding surface 10). In addition, disposed beside the last-named part 161, 16F is an adapted, bent plate profile 163, on top of which a wire 11 is arranged. The wire 11 comprises a starting part 11A which runs out from the vertical plane in which the bar 16 is situated. The wire 11 (and the plate 163) then run at an angle in the side limb a little way until it lies in the same vertical plane as the other sliding surface 12 in the adjoining section 4B. Following on from here is a downwardly angled part 11B, which runs parallel to the wire 16F lying alongside. The start of the converging surface 9C of the first transition element 9 is placed in essentially the same position (seen in the direction of transportation) as the starting end of the angled part 11A of the wire 11.

The device functions as follows with regard to an article of clothing which is provided with a transponder unit, which is intended to be scanned in the scanner unit 22A, 22B. The hanger with the article of clothing (not shown) is carried forward along the sliding rail 4 according to the same principles as described in connection with FIGS. 1–4. When the hanger reaches the part 30 according to the invention, the hanger hook thus slides on the connecting sliding rail 4A in such a way that it (and with it the hanger/garment also) extends essentially at right angles in relation to the direction of transportation. At the inlet end of the part 30, the hanger will thus come into contact with the first control surface 5A of the control device 5. This happens at roughly the same time as the hanger reaches the first transition zone 16A'. Thus the hanger will hereby be exposed to a turning force at the same time as it is advanced forwards by means of the carrier (not shown). The left-hand end of the hanger (seen in the direction of transportation) will hereby be brought to a halt, while the right-hand end of the hanger will be turned forwards at greater speed. This movement will take place by gradual stages, as the left-hand end of the hanger follows the first control surface 5A, until the left-hand end of the hanger is carried on in contact with the second control surface 5B. The hanger hook will hereby be carried up onto the sliding surface 14 of the bar and the hanger with the garment will have been positioned essentially parallel to the direction of transportation. According to the preferred execution shown, the distance between the vertical plane for the bar 16 and the vertical plane for the second control surface 5B is approx. 120 mm, which with a normal hanger means an angle of approx. 30° between the extension of the hanger and the extension of the bar 16. This angle corresponds roughly to the angle at which the scanner elements 22A, 22B are disposed in relation to the direction of transportation, so that the garment will be transported along the bar 16 between the two scanner parts 22A, 22B at an angle which is close to parallel with (max. deviation +/−10°) the extension of the scanner elements, so that reliable scanning can be effected. Following scanning and registration of the garment's transponder, the garment is carried further along the bar 16, with the hook still in contact with its sliding surface 14. Immediately following the passage through the scanner unit 22, the second control surface 5B comes to an end and the left-hand end of the hanger will then be able to swing out freely past the end 5C of the control device. At roughly the same time, the hanger hook is at a level with the first control surface 9A in the first transition element 9, so that the hook is gradually pushed to the right seen in the direction of transportation. After the hanger hook has passed the level part 9B of the first transition organ 9, it slides down from the upper sliding surface 14 of the bar 16 and into the transition zone 16D' on the sliding surface 16F. At the same time, it comes into contact with the angled part 11A of the wire 11. Here the hanger/hook will be moved to the left (seen in the direction of transportation) with an otherwise essentially retained position in relation to the direction of transportation. The hanger hook then slides downwards along the two parallel transition surfaces 16F, 11B, where it reaches the adjoining sliding section 4B, at which it continues to slide in the "perpendicular position" along the two "ordinary" sliding surfaces 10, 12.

The invention is not restricted to what has been described above but can be varied within the scope of the following claims. For example, it is perceived that the invention can be utilized in many forms of conveyors other than chain/link conveyors, such as wire conveyors, etc. Furthermore, it is perceived that it is possible to use many different solutions for the bar 16 to create the sliding surface 14. Apart from the alternatives described above (round bar, assembled flat bar, whole flat bar), extruded aluminium section for example can also be suitable. It is likewise perceived that the transition zones 16A, 16B can be alternated in many ways by means of various types of construction elements, for example plate-shaped parts and round bar/square bar. It is also perceived that the bend 18 can be less or more than 90 degrees, for example 80 or 100 degrees, with the advantages according to the invention retained.

Furthermore, it is perceived that the conveyor can be constructed of sections with a slot in directions other than upwards, for example directed to the side or downwards, with principles according to the invention otherwise retained, the option also being obtained of arranging a continuous surface for the hanger to slide on, which surface however functions in practice as a number of interacting sliding surfaces/points which cause the hanger hook to be positioned at right angles in relation to the direction of transportation. Finally, it is perceived that the invention in certain cases can also be disposed advantageously at the end of a conveyor and that there any requirement for an adjoining section 4B following a part (30) according to the invention can be eliminated.

Figure 8:
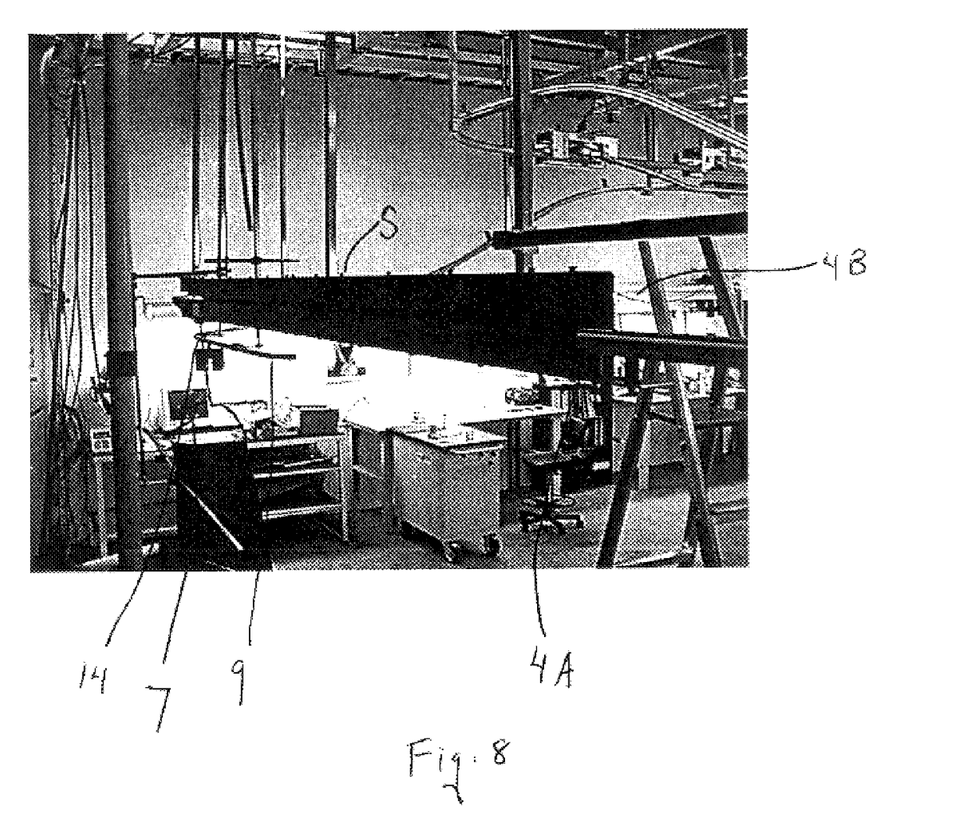
FIG. 8 shows another embodiment of the present invention with the sliding surface directed sideways.
Figure 9:
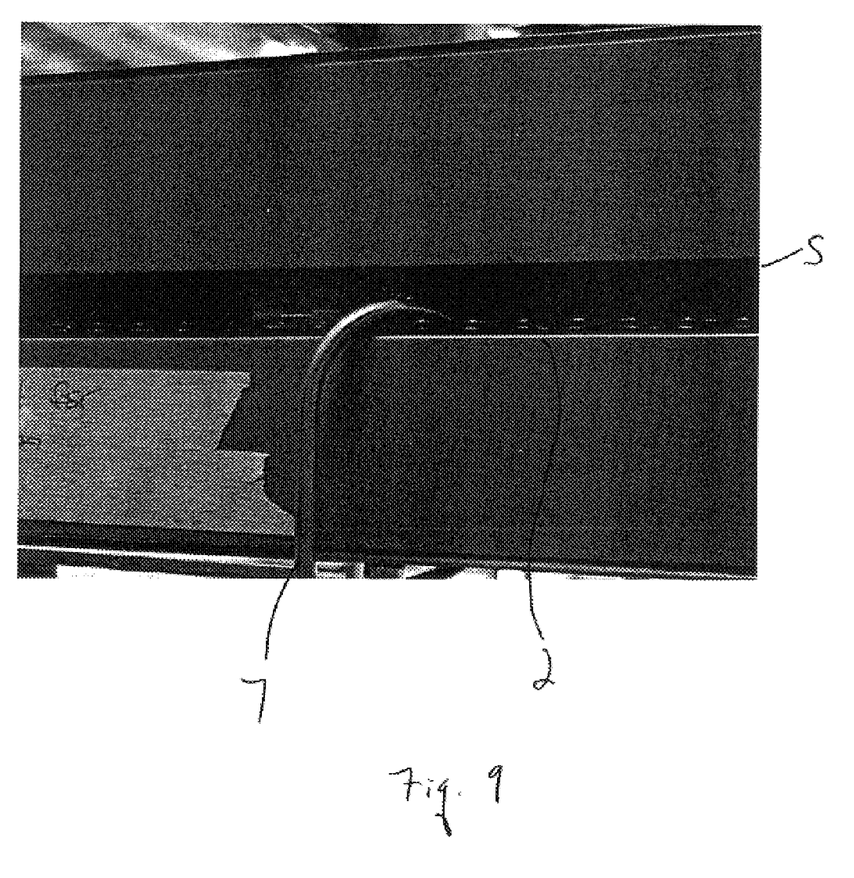
FIG. 9 is an enlarged view of the FIG. 8 embodiment.
Figure 10:
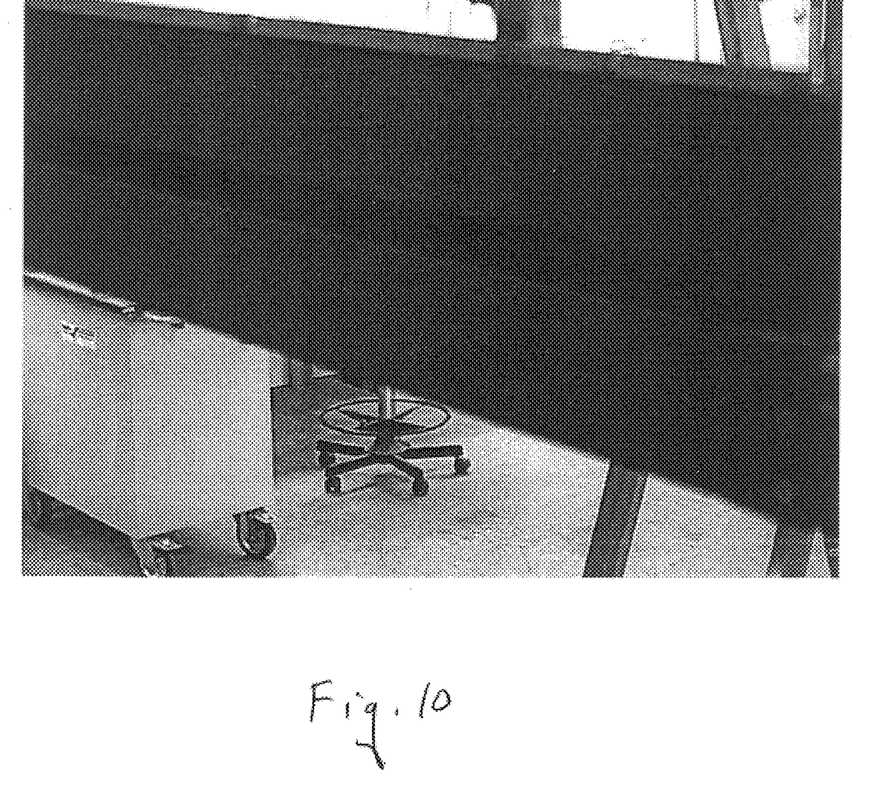
FIG. 10 is another enlarged view of the FIG. 8 embodiment.

FIGS. 8–10 show another alternative embodiment of the present invention. The sliding surface 14 is directed sideways (in contrast to the prior embodiments where surface 14 is directed upwards). Furthermore, the garment hanger 7 is shown between sections 4A and 4B hanging directly on the chain conveyor 2. FIG. 9 shows an enlarged view of the conveyor 2 and hanger 7. Accordingly, the hanger 7 is able to turn to a substantially parallel orientation by turning around its contact point with the chain 2. A bar/guide 99 is arranged adjacent and beneath the chain 2 to provide the sliding surface 14. Of course, other modifications should be readily apparent to those skilled in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Conveyor for garment hangers, comprising an endless mechanism disposed inside sections with a longitudinal slot, said mechanism having carriers which project through said slot and said sections having first sliding surfaces, which are disposed in such a manner that a hanger is positioned essentially at right angles in relation to the direction of advance of the conveyor, a part with a second sliding surface is disposed between two sections and formed in such a way that the garment hanger can be turned into a position which is essentially parallel with regard to the direction of transportation.

2. The conveyor according to claim 1, wherein said second sliding surface is arranged on a bar with a shape which permits the hanger to be turned about the vertical axis of the hanger hook.

3. The conveyor according to claim 2, wherein said bar has a maximum thickness in its horizontal cross-direction of between 1 and 20 mm.

4. The conveyor according to claim 2, wherein said bar has a maximum thickness of between 2 and 12 mm.

5. The conveyor according to claim 2, wherein said bar has a maximum thickness in its horizontal cross-section of between 6 and 10 mm.

6. The conveyor according to claim 3, wherein said bar has a circular cross-section.

7. The conveyor according to claim 1, wherein said bar is placed by the mechanism so that it follows its extension and at a distance in relation to this which is less than the height of said carrier.

8. The conveyor according to claim 1, wherein said part comprises a sharp bend.

9. The conveyor according to claim 8, wherein the bend is approximately 90°.

10. The conveyor according to claim 8, wherein an operating unit with scanning elements is positioned adjacent to said bend.

11. The conveyor according to claim 10, wherein the scanning elements are aerial screens.

12. The conveyor according to claim 10, wherein said operating unit comprises a level wall, which is arranged in a plane which is essentially parallel with the direction of advance of the conveyor following the bend.

13. The conveyor according to claim 1, wherein said second sliding surface at each end of said part is disposed at essentially the same height and in essentially the same vertical plane as the first sliding surface in each adjoining section.

14. The conveyor according to claim 13, wherein the bar connects to or has a first part, which is disposed directed obliquely upwards in relation to the direction in which the sliding surface extends at the end of said adjoining section, and a second part which extends essentially horizontally and connects to said bend.

15. The conveyor according to claim 14, wherein the bar comprises a third part, which extends essentially horizontally on the other side of said bend and a fourth part disposed directed obliquely downwards in relation to the longitudinal direction in which said adjoining section extends.

16. The conveyor according to claim 15, wherein each section has longitudinal recesses, which have an essentially circular cross-section and located inside which are said sliding surfaces, the bar inserting into one of said recesses at the end of each adjoining section, preferably in contact with a sliding element, so that the occurrence of joints is eliminated or reduced.

17. The conveyor according to claim 14, further comprising a second bar disposed extending in parallel with said first and second part of the bar.

18. The conveyor according to claim 15, further comprising a stop device, which is disposed along the third part of the bar at a limited height above this, with a view to preventing the hangers from being pushed off as a result of the movement of the carrier.

19. The conveyor according to claim 1, wherein said slot is open upwardly and is disposed between two sliding elements which form said first sliding surfaces.

20. The conveyor according to claim 1, wherein said mechanism is formed by a chain/link mechanism which is arranged slidably inside said sections.

* * * * *